United States Patent
Lee et al.

(10) Patent No.: US 10,402,285 B2
(45) Date of Patent: Sep. 3, 2019

(54) HYBRID DATABASE CONCURRENT TRANSACTION CONTROL

(71) Applicant: SAP SE, Walldorf (DE)

(72) Inventors: Juchang Lee, Seoul (KR); Chang Gyoo Park, Gwanak-gu (KR)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 15/260,943

(22) Filed: Sep. 9, 2016

(65) Prior Publication Data

US 2018/0074919 A1 Mar. 15, 2018

(51) Int. Cl.
*G06F 17/00* (2019.01)
*G06F 11/14* (2006.01)
*G06F 16/11* (2019.01)
*G06F 16/23* (2019.01)

(52) U.S. Cl.
CPC ........ *G06F 11/1474* (2013.01); *G06F 16/128* (2019.01); *G06F 16/2343* (2019.01); *G06F 16/2358* (2019.01); *G06F 16/2379* (2019.01); *G06F 2201/80* (2013.01); *G06F 2201/82* (2013.01); *G06F 2201/835* (2013.01); *G06F 2201/84* (2013.01)

(58) Field of Classification Search
CPC ......... G06F 17/30362; G06F 17/30377; G06F 17/30566; G06F 11/1474; G06F 17/30088; G06F 17/30368; G06F 2201/80; G06F 2201/82; G06F 2201/835
USPC ........................................................ 707/704
See application file for complete search history.

(56) References Cited

U.S. PATENT DOCUMENTS

2004/0215772 A1\* 10/2004 Dinker .................... H04L 29/06
    709/225
2013/0262423 A1\* 10/2013 Graefe ................ G06F 16/2343
    707/703

\* cited by examiner

*Primary Examiner* — Truong V Vo
(74) *Attorney, Agent, or Firm* — Jones Day

(57) ABSTRACT

A plurality of database modification statements are received as part of a database transaction that implicates data stored within a database. Thereafter, lock requests are initiated that requesting the database to lock the implicated data. At least one database operation by at least one of the database modification statements is then executed prior to receiving responses from at least a portion of the lock requests. After confirming that prior lock requests made by the transaction are successfully processed, a commit to make changes to the corresponding implicated data permanent is initiated. The implicated data can then be caused to be unlocked after the commit completes. Related apparatus, systems, techniques and articles are also described.

19 Claims, 6 Drawing Sheets

HYBRID DATABASE CONCURRENT TRANSACTION CONTROL

TECHNICAL FIELD

The subject matter described herein relates to a hybrid database concurrency control mechanism governing database transaction execution.

BACKGROUND

Conflicts can occur when multiple users concurrently perform read or write transactions on a database. Database transaction management services can help manage locks to prevent data stored within the database from being corrupted or invalidated when multiple users try to read data within the database while other users write to the database. These type of transaction management services can help ensure that users can only modify data within the database that has an associated lock giving the user exclusive access to such data until the lock is released. Locking not only provides exclusivity to write transactions, but also can selectively allow reading of unfinished uncommitted data.

Conflicts amongst concurrent transactions becomes significantly more complex within distributed database computing environments. Conventional database transaction management services within such environments are tightly coupled with components amongst various nodes. In addition, these database transaction management services are a single monolithic code base and operate a single process. Due to the lack of software component isolation and abstraction, these database transaction management services do not provide sufficient flexibility to extend and evolve for more complex distributed database environments.

SUMMARY

In one aspect, a plurality of database modification statements are received as part of a database transaction that implicates data stored within a database. Thereafter, lock requests are initiated that requesting the database to lock the implicated data. At least one database operation by at least one of the database modification statements is then executed prior to receiving responses from at least a portion of the lock requests. After confirming that prior lock requests made by the transaction are successfully processed, a commit to make changes to the corresponding implicated data permanent is initiated. The implicated data can then be caused to be unlocked after the commit completes.

Subsequent to the initiating of the commit, it can be determined whether all of the lock requests have been granted. The commit can be rolled back if it is determined that not all of the lock requests have been granted or the commit can be finalized if it is determined that all of the lock requests have been granted. A database log characterizing changes to the implicated data can be appended after the commit is finalized.

Initiating the lock requests can include, transmitting, by a transaction client, the lock requests to a lock server manager.

A transaction client can obtain, from a transaction broker server, a snapshot timestamp for each database modification statement that indicates when such statement was initiated that can be used in determining whether or not to grant the corresponding lock request.

Initiating the commit can include transmitting, by a transaction client, a commit request to a transaction broker server characterizing the database manipulation statements.

Causing the implicated data to be unlocked after the commit completes can include transmitting, by the transaction client to a lock server, at least one request to unlock the implicated data.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
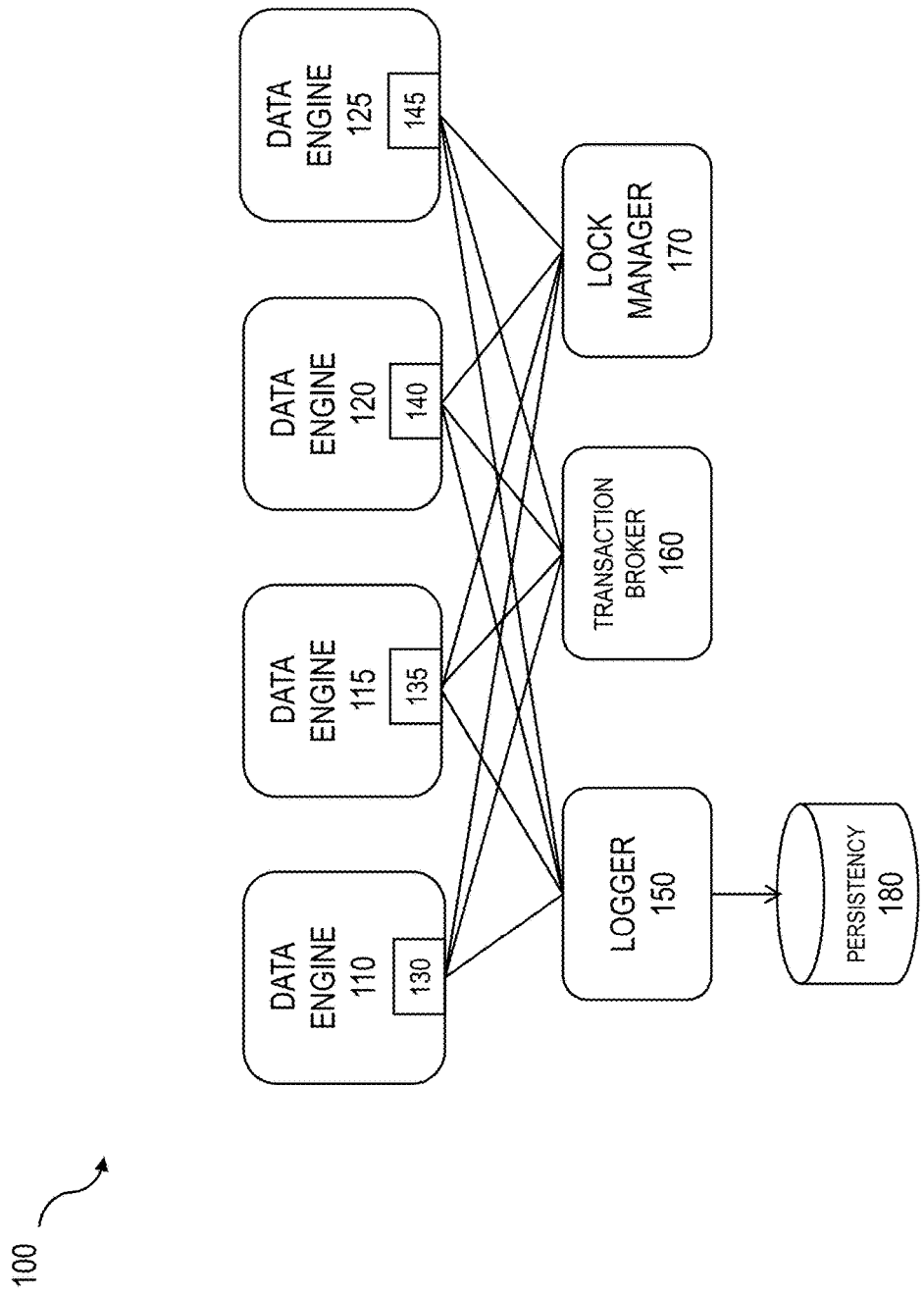
FIG. 1 is a system diagram illustrating an architecture for implementing a global transaction management service across multiple data engines.

FIG. 1 is a diagram 100 illustrating a distributed database computing environment for implementing a transaction management service layer in which there are a plurality of data engines 110, 120, 130, 140 which can be queried or otherwise access from each of a plurality of remote computing systems (not shown) via a computing network or networks. The data engines 110-125 can take various forms including, without limitation, in-memory database systems such as the SAP HANA database platform and in-memory query engines such as the SAP HANA VORA platform which plugs into the APACHE SPARK execution framework to provide enriched interactive analytics on data stored in HADOOP. The data engines 110-125 can also take other forms of databases and data engines such as Document Store, Key-Value Store or disk-based DBMS engines.

The data engines 110-125 are connected to a logger server 150 (coupled to physical persistency 180), a transaction broker server (TB) 160 and at least one lock manager (LK) 170 via respective client libraries (CL) 130-145. The CL 130-145 can be embedded to nodes of the data engines 110-125. The CLs 130-145 can provide an abstraction of transactions wrapping up the access methods to the TB server 160 and the LK servers 170. If a data engine 110-125, which embeds the CL 130-145 in the same process boundary, calls an access method provided by the CL 130-145, the CL 130-145 can process the call and, if necessary, communicate with the backend TB server 160 and/or the LK servers 170. During communication, the CL 130-145 can also apply optimization to group multiple concurrent requests into a single physical call in order to efficiently utilize the given network bandwidth (called as inter-transaction grouping). If there are multiple concurrent transactions which are making commit requests to TB server 160, for example, then the requests can be merged and grouped into a single physical network call and also, at the TB server 160, the requests from the concurrent transaction can be processed concurrently. Or, if a call to the TB server 160 or the LK server 170 need not be made synchronously, the CL 130-145 can selectively buffer the call and then aggregate the call with the next consecutive calls to minimize the network communication with the backend TB server 160 or LK server 170 (called as intra-transaction grouping). For example, if a transaction is executing multiple statements and each of the statement is required to acquire a separate lock item at LK server 170, the lock requests from the same transaction can be buffered at the CL side 130-145 (instead of making the lock request call on each statement execution during the course of the transaction life time) and then a single physical network request can be made at the commit time of the transaction. The CL 130-145 need not maintain their own persistency but can rely on an external persistency, which could be shared-log persistency or conventional database persistency as provided in the respective data engine 110-125. In addition, the TB server 160 and LK server 170 can respectively have multiple instances to provide performance scalability and/or for high availability purposes. In addition, in some variations, the data engines 110-140 can communicate directly with the logger server 150, the transaction broker server (TB) 160 and the at least one lock manager server (LK) 170 directly without the use of a CL 130-145.

The logger server 150 can log the various read and write transactions across the data engines 110-125 in the persistency 180. The CLs 130-145 provide information about the respective read and write operations at each of the data engines 110-125 to provide coordination for the transaction management service layer. In addition, the logger server 150 can harmonize or otherwise transform data from the CLs 130-145 into a unified format.

The TB server 160 can maintain a global commit timestamp (GCT) which can be incremented when a (global) write transaction commits across one or more of the data engines 110-125. The GCT can play a central role in snapshot isolation implementation. All the read transactions can acquire a start timestamp (i.e., the snapshot timestamp) by reading the GCT value at the time when the transactions start and then, based on the assigned start timestamp value, it is decided which data should be visible to the transaction or not during the course of the query processing in the transaction. For example, transaction T1 starts a query execution and then a transaction T2 inserts a new record R1 into the database and commits. Then, by the requirement of snapshot isolation, T2's committed data R1 should not be visible to the transaction T1 because T1 started earlier than T2's commit operation. This visibility control is achieved by maintaining the GCT, which is increment on every transaction commit, and assigning the transaction start timestamp based on the GCT value. In addition, the TB server 160, based on the GCT, can offer a commit identification (CommitID) to committing write transactions and a snapshot timestamp to starting read transactions (or statements) which, in turn, provides visibility control especially under snapshot isolation. In some variations, in order to avoid too frequent access to the TB server 160 from the respective CL 130-145, a snapshot timestamp can be assigned from local commit timestamp (LCT), which is a cached value of GCT, maintained by the individual CLs 130-145.

The TB server 160 can also maintain a transaction identification (TID) generator. When a transaction starts, the transaction can acquire its unique identifier from the TID generator. Again, in order to avoid too frequent access to the TB server 160 from the CLs 130-145, a range of TID values can be cached at the individual CLs 130-145. And then, after consuming all the cached values, the CLs 130-145 request the next set of unused TID values to TB server 160.

The TB server 160 can also maintain a list of active consistent views (i.e., read transactions or read statements) in order to provide necessary information (e.g., minimum snapshot timestamp, etc.) to MVCC (multi-version concurrency control) garbage collectors. Again, in order to avoid too frequent access to the TB server 160 from the CLs 130-145, instead of updating the minimum snapshot timestamp value, the CLs 130-145 can asynchronously and lazily update the minimum snapshot timestamp values of the TB server 160. If the CLs try to update the minimum snapshot timestamp value of TB whenever a statement or a transaction finishes. The minimum snapshot timestamp value can be used for correct garbage collection under MVCC. For example, when a transaction T1 starts, its snapshot timestamp must be registered at the TB server 160. Otherwise, the record versions which should be visible to T1 could be deleted by a background garbage collector. However, in order to avoid retaining record versions too long, the snapshot timestamp can be unregistered from the TB server 160 after finishing the execution of transaction T1. Unregistering the snapshot timestamp need not happened immediately upon the transaction or query completion, but rather, the unregistering can be delayed slightly. With such an arrangement, the retention time of record versions can slightly increase and it can avoid a network round trip at the time of the transaction or query completion. The LK server 170 can maintain a hierarchy of multi-granular lock tables. F or example, the locks can pertain to one or more of table locks, partition locks and record locks such that the LK server 170 can detect transactional conflicts among concurrent transactions, following the chosen conflict detection method per transaction. Various conflict detection methods can be used including, without limitation, optimistic concurrency control (OCC), pessimistic locking (PL), or a hybrid version (HL) of OCC and PL. As most conflict detection methods have trade-offs, users can choose the right one considering their own scenarios. Particularly, for transactions running under PL or HL, the LK server 170 can offer automatic deadlock detection by reading through the corresponding lock table(s) and analyzing each table/partition/record being locked to identify a list of transactions seeking to lock such table/partition/record to create a identify deadlocks.

The LK server 170 can also maintain a value lock table for uniqueness check purpose among concurrent transactions. Users can give an arbitrary string as a lock key to check, using the value lock table, if there are any other write transaction which attempts to use the same key.

In addition to the optimizations to minimize interactions with underlying TB server 160 and the LK server 170, described above (e.g. LCT, caching a range of TID values), the CLs 130-145 can optimize the interactions with the TB server 160 and the LK server 170 by grouping multiple requests coming from concurrent transactions (called inter-transaction grouping) or by grouping multiple requests of the same transaction with buffering them at CL side 130-145 (called intra-transaction grouping).

Figure 2:
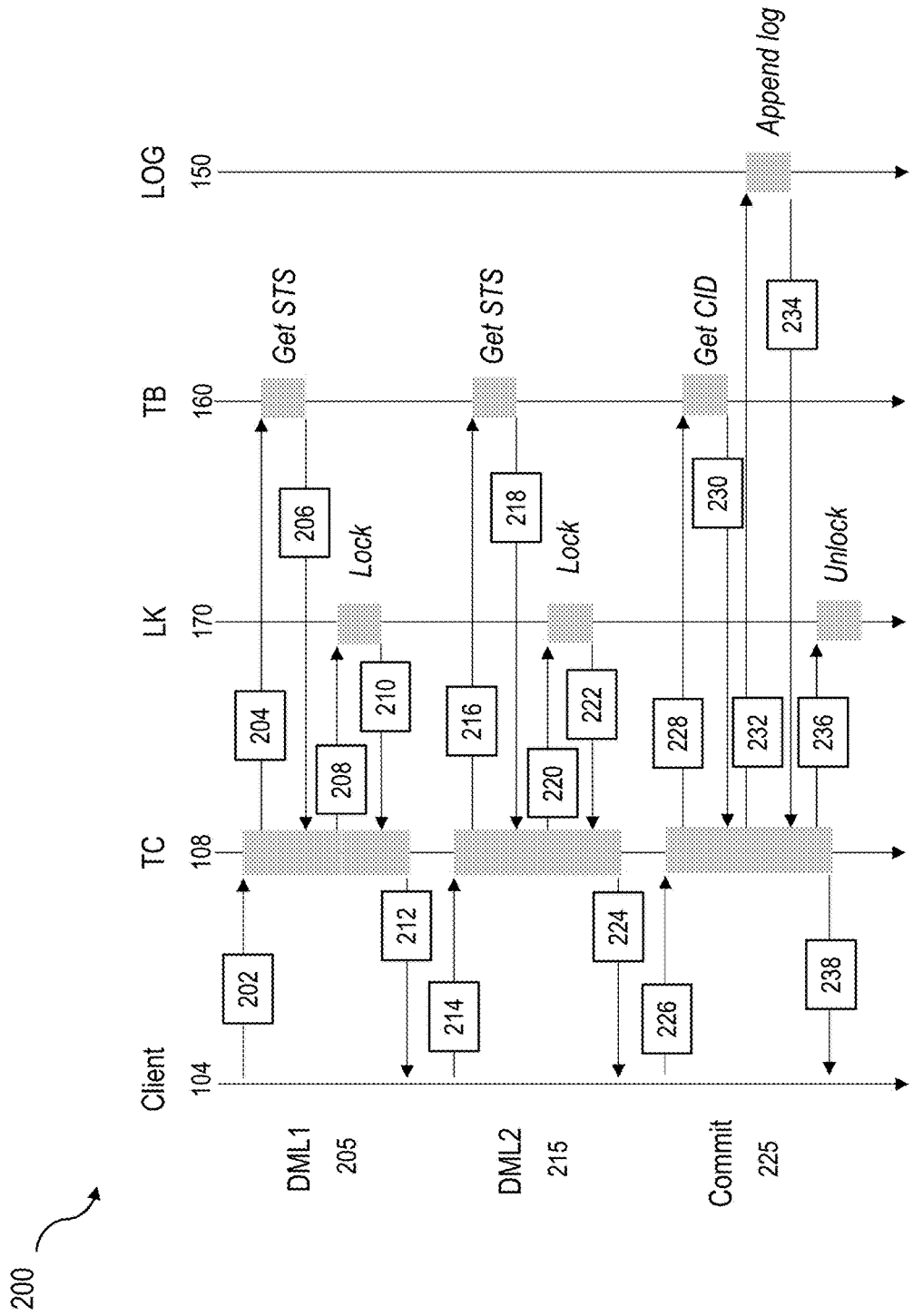
FIG. 2 is a data flow diagram illustrating the use of pessimistic locking concurrency control.

FIG. 2 is a data flow diagram 200 illustrating transaction execution flow using a combination of pessimistic locking and serializable snapshot isolation (SSI). It will be appreciated herein that other types of isolation techniques can be used in connection with all of the locking techniques. Initially, the client 104 initiates a first transaction by issuing Data Manipulation Language 1 (DML1) instruction 205 (202) to the transaction client 108. The transaction client 108 then sends a request (204) to the transaction broker server 160 for a snapshot timestamp for use in transaction conflict resolution. The transaction broker server 160 then provides (206) the snapshot timestamp to the transaction client 108. The transaction client 108 then requests (208) a lock for the associated data (e.g., table, record, partition, etc.) from the lock broker server 170. The lock broker server 170 then responds (210) to the transaction client 108 regarding the lock request. If the response indicates that the requested data is locked by the transaction, the transaction continues; otherwise, if the data is not available to be locked by the transaction due to it being already locked, the transaction is rolled back by the transaction client 108 which notifies (212) of the disposition.

With pessimistic locking, a conflict check is performed for each DML operation. Continuing with the example, the client 104 initiates a second transaction by issuing DML2 instruction 215 (214) to the transaction client 108. The transaction client 108 then sends a request (216) to the transaction broker server 160 for a snapshot timestamp for use in transaction conflict resolution. The transaction broker server 160 then provides (218) the snapshot timestamp to the transaction client 108. The transaction client 108 then requests (220) a lock for the associated data (e.g., table, record, partition, etc.) from the lock broker server 170. The lock broker server 170 then responds (222) to the transaction client 108 regarding the lock request. If the response indicates that the requested data is locked by the transaction, the transaction continues; otherwise, if the data is not available to be locked by the transaction due to it being already locked, the transaction is rolled back by the transaction client 108 which notifies (224) of the disposition.

The client 104 subsequently initiates a commit operation 225 to make the changes requested by the two transactions (DML1 205 and DML2 215) permanent and conveys data (226) indicating the same to the transaction client 108. The transaction client 108 then requests (228) a commit ID from the transaction broker server 160. The transaction broker server 160 then provides (230) the commit ID to the transaction client 108. In response, the transaction client 108 transmits data (232) to the logger server 150 characterizing the changes including the commit ID. The logger server 150 then sends a confirmation (234) to the transaction client 108 so that the transaction client can cause (236) the lock server to unlock the affected data. The transaction client 108 subsequently transmits (238) confirmation of the commit to the client.

Figure 3:
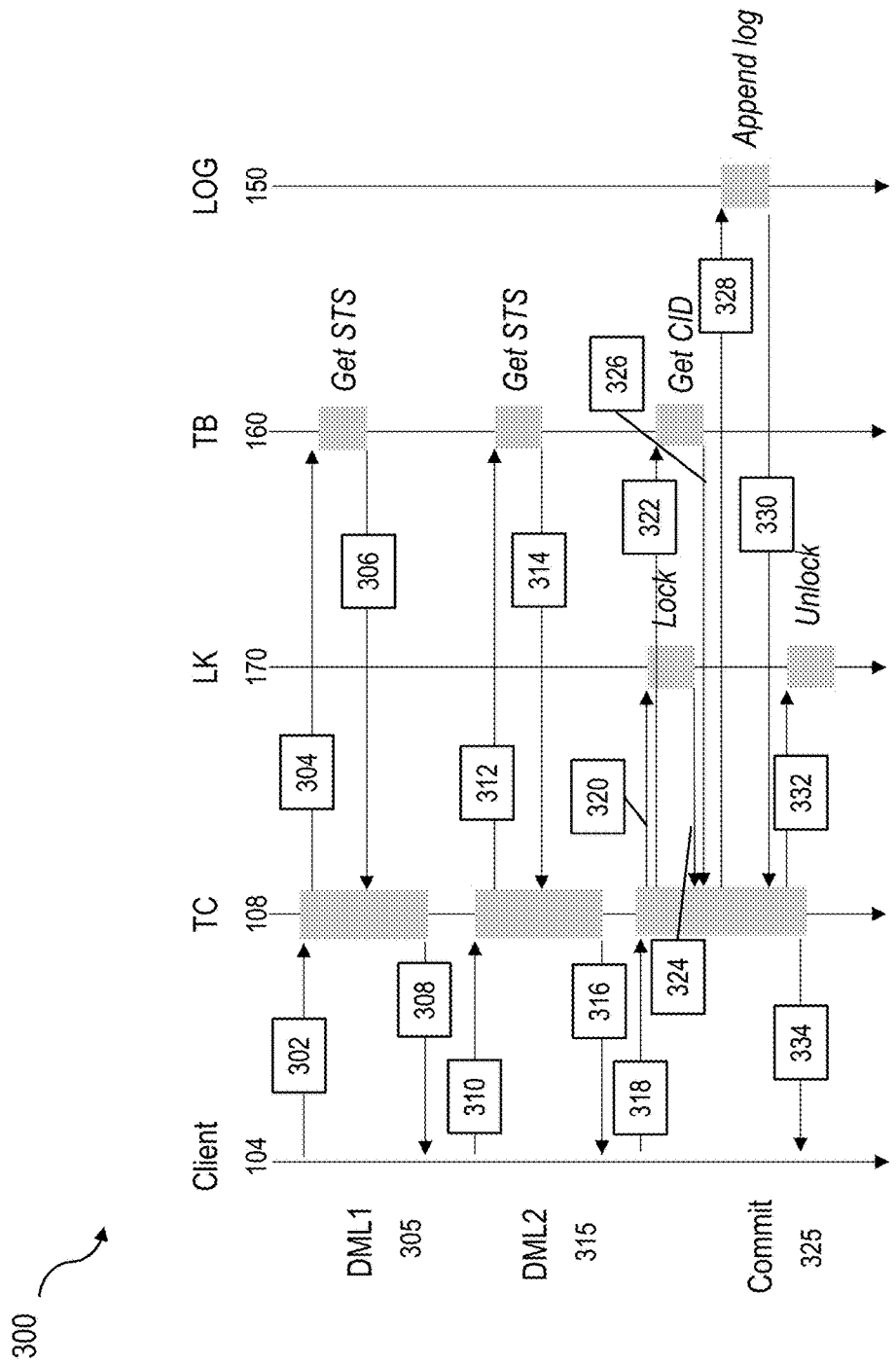
FIG. 3 is a data flow diagram illustrating the use of optimistic locking concurrency control.

FIG. 3 is a data flow diagram 300 illustrating transaction execution flow using a combination of optimistic concurrency control and serializable snapshot isolation (SSI). In this example, the client 104 transmits (340) data to the transaction client 108 to initiate a first operation DML1 305. The transaction client 108 then sends a request (304) to the transaction broker server 160 for a snapshot timestamp for use in transaction conflict resolution. The transaction broker server 160 then provides (306) the snapshot timestamp to the transaction client 108. The transaction client 108 then responds (308) to the client 104 regarding the snapshot timestamp. With optimistic concurrency control, in contrast to pessimistic concurrency control, the transaction continues without a lock being assigned to the corresponding data.

Continuing with the example of FIG. 3, the client 104 initiates a second transaction by issuing DML2 instruction 315 (316) to the transaction client 108. The transaction client 108 then sends a request (212) to the transaction broker server 160 for a snapshot timestamp for use in transaction conflict resolution. The transaction broker server 160 then provides (314) the snapshot timestamp to the transaction client 108. The transaction client 108 then responds (316) to the client 104 regarding the snapshot timestamp.

The client 104 subsequently initiates a commit operation 325 to make the changes requested by the two transactions (DML1 305 and DML2 315) permanent and conveys data (318) indicating the same to the transaction client 108. The transaction client 108 then sends (320) a lock request to the lock server 170 to request that the data implicated by DML1 305 and DML2 315 be locked. The transaction client 108 then requests (322) a commit ID from the transaction broker server 160 (prior to receiving a response from the lock server 160). The lock server then provides confirmation (324) of whether or not the underlying data is locked. In parallel or subsequently, the transaction broker server 160 then provides (326) the commit ID to the transaction client 108. In response (and assuming a rollback is not triggered), the transaction client 108 transmits data (328) to the logger server 150 characterizing the changes including the commit ID. The logger server 150 then sends a confirmation (330) to the transaction client 108 so that the transaction client can cause (332) the lock server to unlock the affected data. The transaction client 108 subsequently transmits (334) confirmation of the commit to the client.

Figure 4:
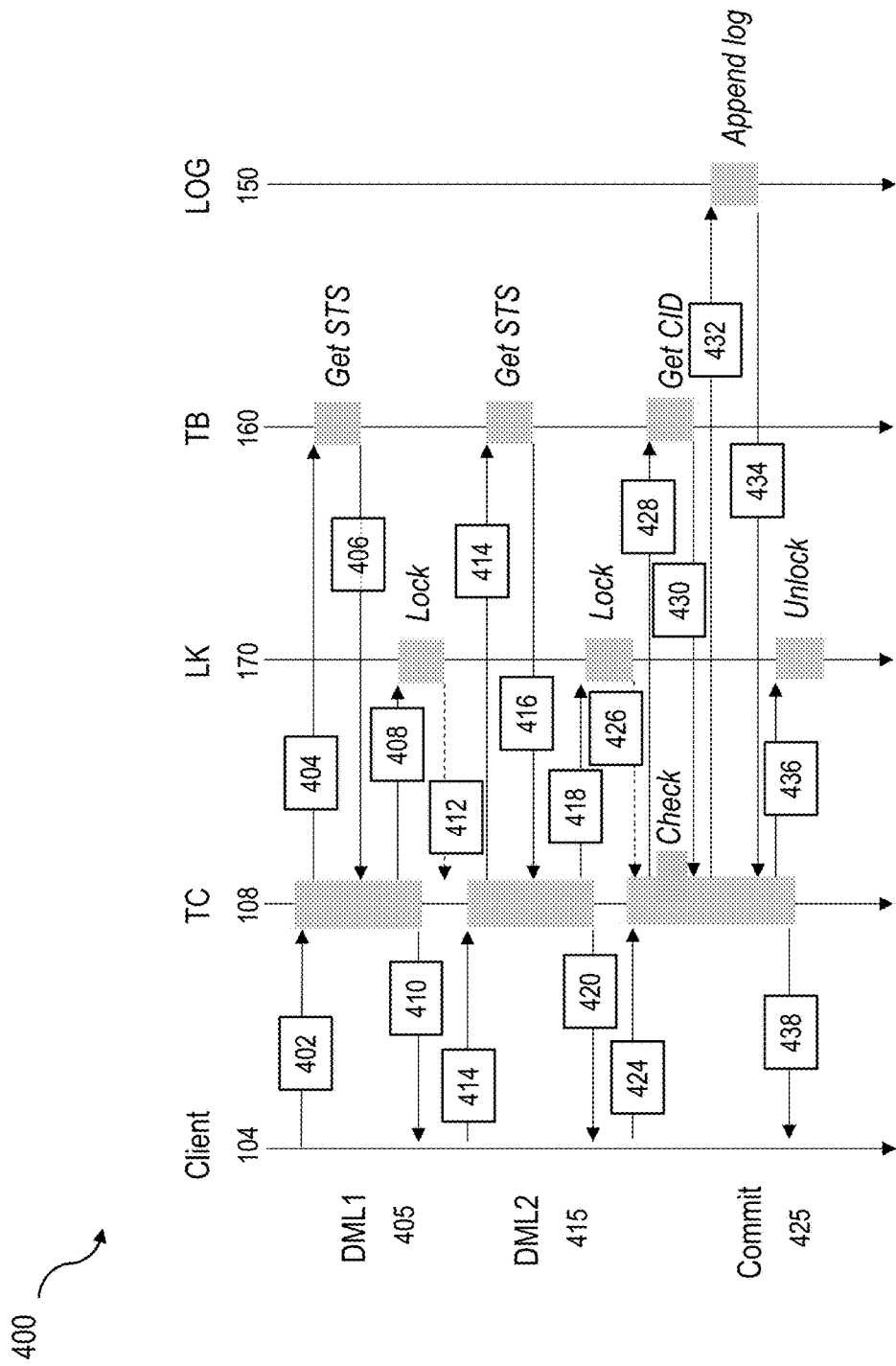
FIG. 4 is a data flow diagram illustrating the use of hybrid locking concurrency control.

FIG. 4 is a data flow diagram 400 illustrating transaction execution flow using a combination of hybrid locking and serializable snapshot isolation (SSI). Initially, the client 104 initiates a first transaction by issuing DML1 405 (402) to the transaction client 108. The transaction client 108 then sends a request (404) to the transaction broker server 160 for a snapshot timestamp for use in transaction conflict resolution. The transaction broker server 160 then provides (406) the snapshot timestamp to the transaction client 108. The transaction client 108 then requests (408) a lock for the associated data (e.g., table, record, partition, etc.) from the lock broker server 170. Rather than wait for the lock server 170 to respond (as provided in connection with the pessimistic locking arrangement of FIG. 2), the transaction client 108 notifies (410) the client 104 that a lock has been requested for the corresponding data. At some later point, the lock server 170 transmits (412) an indication of whether or not the data implicated by DML1 405 was locked.

Regardless of whether the lock server 160 responds (412), the client 104 initiates a second transaction by issuing DML2 instruction 415 (414) to the transaction client 108. The transaction client 108 then sends a request (416) to the transaction broker server 160 for a snapshot timestamp for use in transaction conflict resolution. The transaction broker server 160 then provides (418) the snapshot timestamp to the transaction client 108. The transaction client 108 then requests (420) a lock for the associated data (e.g., table, record, partition, etc.) from the lock broker server 170. Rather than wait for the lock server 170 to respond, the transaction client 108 notifies (422) the client 104 that a lock has been requested for the corresponding data. At some later point, the lock server 170 transmits (426) an indication of whether or not the data implicated by DML1 415 was locked.

The client 104 at some point (which can be before the receipt of one or more of the lock request confirmations (412), (426)) initiates a commit operation 425 to make the changes requested by the two transactions (DML1 405 and DML2 415) permanent and conveys data (424) indicating the same to the transaction client 108. The transaction client 108 then requests (428) a commit ID from the transaction broker server 160. The transaction broker server 160 then provides (430) the commit ID to the transaction client 108. In response, the transaction client 108 can confirm whether the lock confirmations (412), (426) were received and, if so, transmits data (432) to the logger server 150 characterizing the changes including the commit ID. The logger server 150 then sends a confirmation (434) to the transaction client 108 so that the transaction client can cause (436) the lock server to unlock the affected data. The transaction client 108 subsequently transmits (438) confirmation of the commit to the client.

Figure 5:
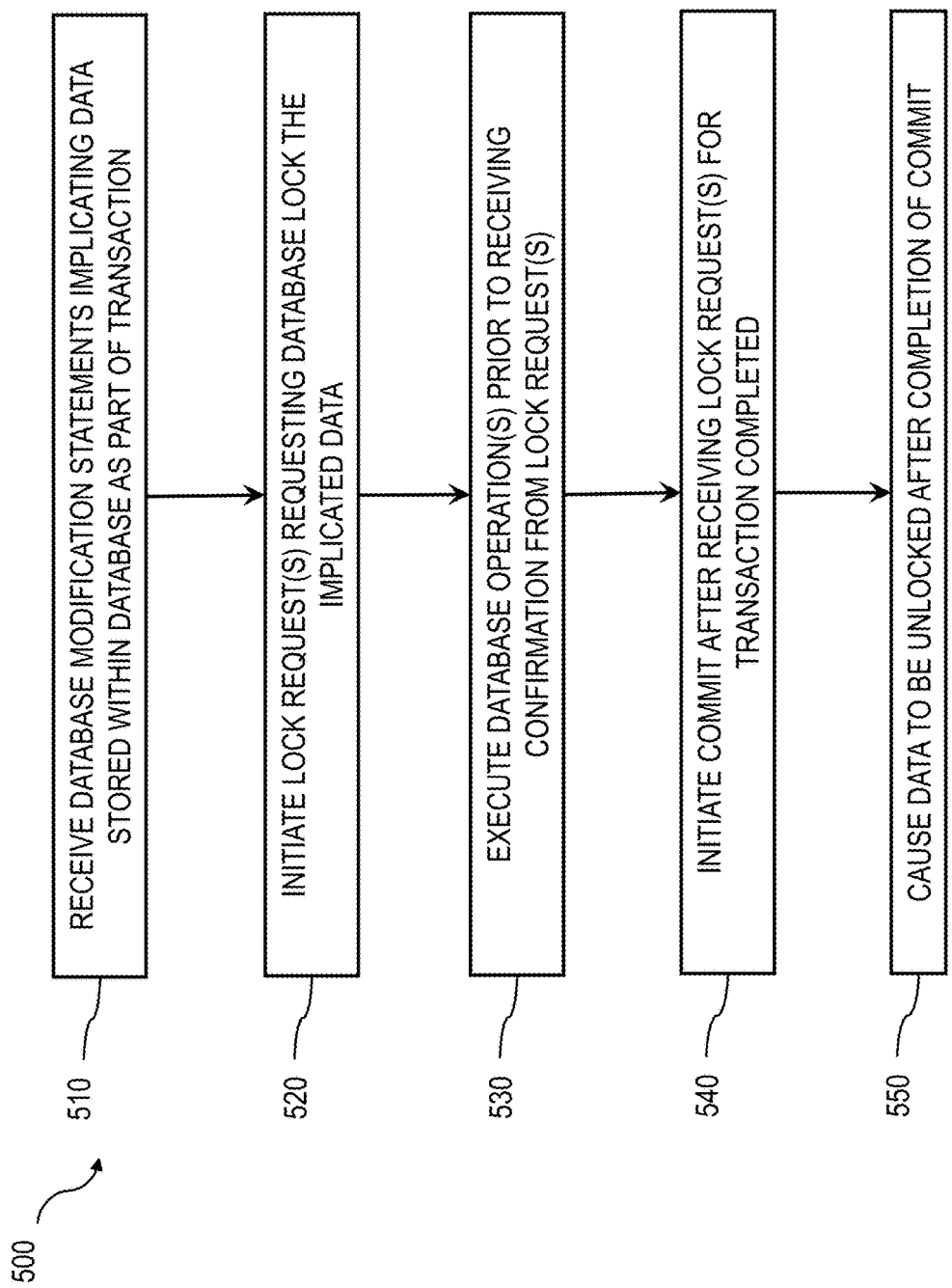
FIG. 5 is process flow diagram illustrating hybrid locking concurrency control.

FIG. 5 is a diagram 500 in which, at 510, a plurality of database modification statements are received as part of a database transaction that implicate data stored within a database. Subsequently, at 520, lock requests are initiated that requests that the database lock the implicated data. Further, at 530, prior to receiving responses from at least a portion of the lock requests, at least one database operation specified by at least one of the database modification statements is executed. Next, at 540, after confirming that prior lock requests made by the transaction are successfully processed, a commit to make changes to the corresponding implicated data permanent is initiated. Later, at 550, the implicated data is caused to be unlocked after the commit completes.

It will be appreciated that the hybrid locking concurrency control mechanisms described herein provide many technical advantages. For example, the current subject matter provides database locking techniques which, in some scenarios, provides quicker results and which can also utilize fewer processing resources as compared to conventional locking techniques. With regard to overhead to DML latency, hybrid locking only requires one network call (as does optimistic concurrency control) while pessimistic locking requires two network calls. With regard to statement retry upon a serialization failure, hybrid locking provides a dependency while retry is possible with pessimistic locking and not possible with optimistic concurrency control. In addition, hybrid locking provides better early report of transmission errors as compared to optimistic concurrency control and also uses less overhead to commit latency. In addition, while the current subject matter can, in some variations, utilize a deadlock detector, such deadlock detector can act to reduce the number of deadlock as compared to optimistic concurrency control.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 6:
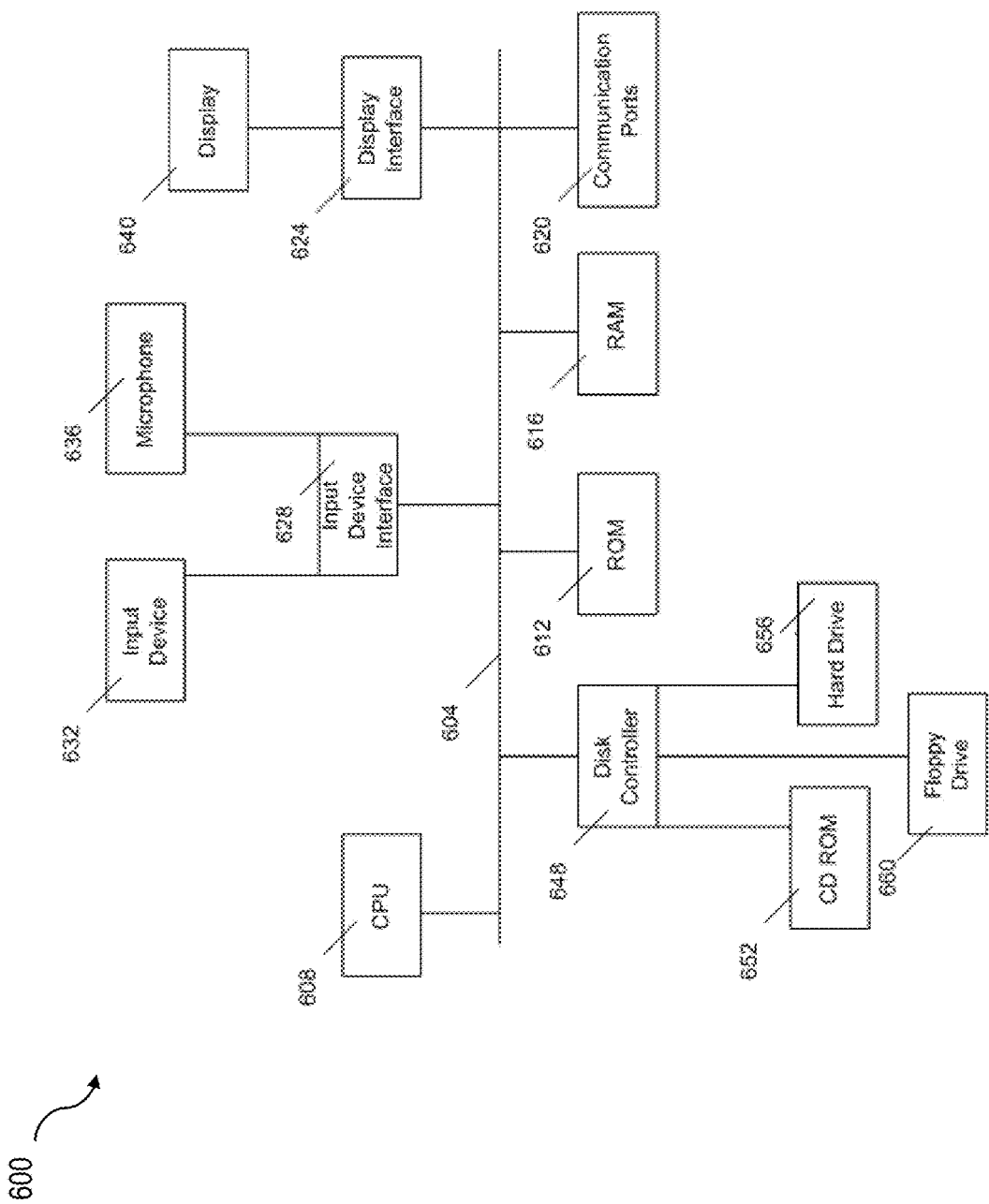
FIG. 6 is a diagram illustrating a sample computing device for executing aspects of the current subject matter.

FIG. 6 is a diagram illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 614, can be in communication with the processing system 608 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives may be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 636, or tactile feedback); and input from the user may be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 624, the input device 632, the microphone 636, and input device interface 628.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving a first transaction including at least one database modification statement implicating data stored within a database;
   receiving a second transaction including at least one database modification statement implicating data stored within the database;
   initiating a first lock request requesting that the database lock the data implicated by the first transaction;
   initiating a second lock request requesting that the database lock the data implicated by the second transaction;
   executing, prior to receiving responses from one or more of the first lock request and the second lock request, at least one database operation specified by at least one of the database modification statements;
   initiating a first commit to make changes to the data implicated by the first transaction permanent;
   initiating a second commit to make changes to the data implicated by the second transaction permanent;
   determining, subsequent to the initiating of the first and the second commits, whether both of the first lock request and the second lock request have been granted;
   rolling back the commits if it is determined that not all of the lock requests have been granted; and
   finalizing the commits if it is determined that both of the lock requests have been granted; and
   causing the implicated data to be unlocked after the commits are finalized.

2. The method of claim 1 further comprising:
   appending a database log characterizing changes to the implicated data after the commits are finalized.

3. The method of claim 1, wherein initiating the first and second lock requests comprises:
   individually transmitting, by a transaction client, the first and second lock requests to a lock server manager.

4. The method of claim 1 further comprising:
   obtaining, by a transaction client from a transaction broker server, a snapshot timestamp for each database modification statement that indicates when such statement was initiated and which is used in determining whether or not to grant the corresponding lock request.

5. The method of claim 1, wherein initiating the commit comprises:
   transmitting, by a transaction client, a commit request corresponding to each of the first transaction and the second transaction to a transaction broker server characterizing the database modification statements.

6. The method of claim 5, wherein causing the implicated data to be unlocked after the commits finalize comprises:
   transmitting, by the transaction client to a lock server, at least one request to unlock the implicated data.

7. A system comprising:
   at least one data processor; and
   memory storing instructions which, when executed by the at least one data processor, result in operations comprising:

receiving a first transaction including at least one database modification statement implicating data stored within a database;

receiving a second transaction including at least one database modification statement implicating data stored within the database;

initiating a first lock request requesting that the database lock the data implicated by the first transaction;

initiating a second lock request requesting that the database lock the data implicated by the second transaction;

executing, prior to receiving responses from one or more of the first lock request and the second lock request, at least one database operation specified by at least one of the database modification statements;

initiating a first commit to make changes to the data implicated by the first transaction permanent;

initiating a second commit to make changes to the data implicated by the second transaction permanent;

determining, subsequent to the initiating of the first and the second commits, whether both of the first lock request and the second lock request have been granted;

rolling back the commits if it is determined that not all of the lock requests have been granted; and finalizing the commits if it is determined that both of the lock requests have been granted; and causing the implicated data to be unlocked after the commits are finalized.

8. The system of claim 7, wherein the operations further comprise:
appending a database log characterizing changes to the implicated data after the commits are finalized.

9. The system of claim 7, wherein initiating the first and second lock requests comprises:
individually transmitting, by a transaction client, the first and second lock requests to a lock server manager.

10. The system of claim 7, wherein the operations further comprise:
obtaining, by a transaction client from a transaction broker server, a snapshot timestamp for each database modification statement that indicates when such statement was initiated and which is used in determining whether or not to grant the corresponding lock request.

11. The system of claim 7, wherein initiating the commit comprises:
transmitting, by a transaction client, a commit request corresponding to each of the first transaction and the second transaction to a transaction broker server characterizing the database modification statements.

12. The system of claim 11, wherein causing the implicated data to be unlocked after the commits finalize comprises:
transmitting, by the transaction client to a lock server, at least one request to unlock the implicated data.

13. The system of claim 7 further comprising the database.

14. A non-transitory computer program product storing instructions which, when executed by at least one data processor forming part of at least one computing system, result in operations comprising:

receiving a first transaction including at least one database modification statement implicating data stored within a database;

receiving a second transaction including at least one database modification statement implicating data stored within the database;

initiating a first lock request requesting that the database lock the implicated data implicated by the first transaction;

initiating a second lock request requesting that the database lock the data implicated by the second transaction;

executing, prior to receiving responses from one or more of the first lock request and the second lock request, at least one database operation specified by at least one of the database modification statements;

initiating a first commit to make changes to the data implicated by the first transaction permanent;

initiating a second commit to make changes to the data implicated by the second transaction permanent;

determining, subsequent to the initiating of the first and the second commits, whether both of the first lock request and the second lock request have been granted;

rolling back the commits if it is determined that not all of the lock requests have been granted; and finalizing the commits if it is determined that both of the lock requests have been granted; and causing the implicated data to be unlocked after the commits are finalized.

15. The computer program product of claim 14, wherein the operations further comprise:
appending a database log characterizing changes to the implicated data after the commits are finalized.

16. The computer program product of claim 14, wherein initiating the first and second lock requests comprises:
individually transmitting, by a transaction client, the first and second lock requests to a lock server manager.

17. The computer program product of claim 14, wherein the operations further comprise:
obtaining, by a transaction client from a transaction broker server, a snapshot timestamp for each database modification statement that indicates when such statement was initiated and which is used in determining whether or not to grant the corresponding lock request.

18. The computer program product of claim 14, wherein initiating the commit comprises:
transmitting, by a transaction client, a commit request corresponding to each of the first transaction and the second transaction to a transaction broker server characterizing the database modification statements.

19. The computer program product of claim 18, wherein causing the implicated data to be unlocked after the commits finalize comprises:
transmitting, by the transaction client to a lock server, at least one request to unlock the implicated data.

* * * * *